Figure 1:
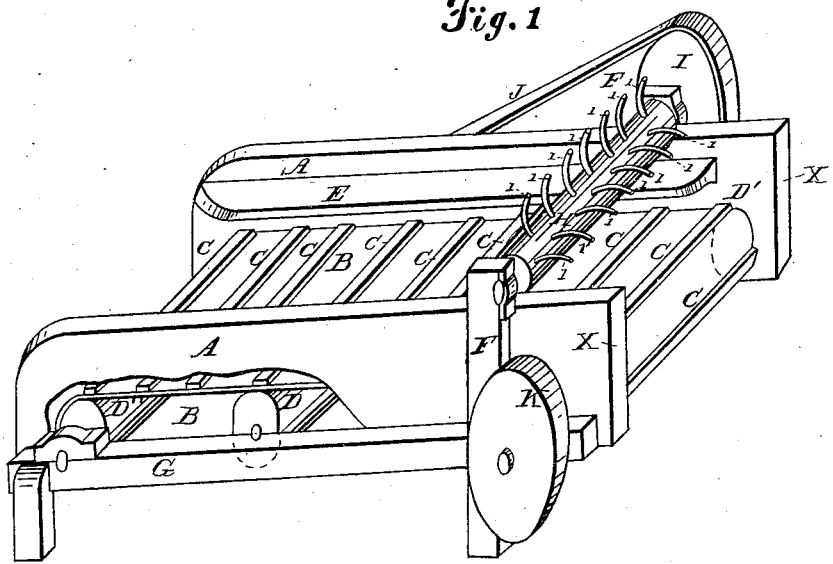

W. J. SLOAN.
Thrashing Machine.

No. 68,390.

Patented Sept. 3, 1867.

WITNESSES:
Geo L Chapin
A Haynaeel

INVENTOR.
Wm J Sloan
By his attorney
Geo L Chapin

UNITED STATES PATENT OFFICE.

WILLIAM J. SLOAN, OF BLOOM, ILLINOIS.

IMPROVEMENT IN THRASHING-MACHINES.

Specification forming part of Letters Patent No. 68,390, dated September 3, 1867.

*To all whom it may concern:*

Be it known that I, WM. J. SLOAN, of Bloom, in the county of Cook and State of Illinois, have invented a Feeder for Thrashing-Machines; and I do hereby declare that the following is a full, clear, and exact description of the construction and operation, reference being had to the accompanying drawing and letters marked thereon, making a part of this description, in which—

Figure 1 is a perspective representation of my feeder.

The nature of my invention consists in the use of a substantial frame, supporting rollers over which a ribbed endless belt is made to pass and carry straw under a rotary cylinder having suitable curved arms for feeding the straw into the thrasher.

In order to give a correct understanding of my device, I will refer to the parts in detail.

A shows the sides of the frame, which project above the apron B far enough to prevent straw from falling off at the sides of the feeder.

D' D' D represent rollers having bearings on the frame-work G at both sides of the machine, D' D' being the drive-rollers, and D the one which supports the apron B, any number of which may be used in the usual manner. I use a guard, E, at both sides of the feeder, for the purpose of preventing straw from getting between apron B and sides A and causing the apron to slip on the rollers D'.

H represents what I term a "feeder," and has bearings in posts F and a drive-pulley, I, attached to its shaft and driven by belt J, passing over a pulley attached to opposite end of roller D''. The feeder consists in a suitable cylinder having a series of curved arms, 1, bent in an opposite direction to that which the cylinder runs, by which means straw will not become entangled or wound around the cylinder. By this arrangement a very convenient device is provided for feeding thrashing-machines with loose material—such as gleanings, broken bundles, and tailings—when cleaning up a run, and as the foregoing has generally a considerable amount of smut and dirt the operator who feeds the thrasher is much more annoyed than when feeding sheaves, and as the feeder can be set near enough to any common thrasher to convey the straw to the cylinder no expensive change in construction is required in order to make my invention applicable.

Operation: The ends X X can be set closely or hung to the thrasher, as most convenient, and the belt which carries the riddles of the separator should receive its motion from the same pulley which communicates power to the pulley K, by which means the same quantity of straw will pass through my feeder that is carried away from the thrasher.

I know that the apron B has been in common use, together with ribs C. It is therefore not claimed; but What I do claim, and desire to secure by Letters Patent, is—

A feeder having frame A, guards E, and endless apron B, in combination with cylinder H, having curved arms 1, when constructed substantially as and for the purpose set forth.

WM. J. SLOAN.

Witnesses:
GEO. L. CHAPIN,
A. HAYWARD.